United States Patent
Chang et al.

(10) Patent No.: US 7,322,733 B2
(45) Date of Patent: Jan. 29, 2008

(54) LIGHT GUIDE PLATE HAVING MICRO-REFLECTORS

(75) Inventors: Jee-Gong Chang, Tainan Hsien (TW);
Yu-Bin Fang, Tainan Hsien (TW);
Chi-Feng Lin, Tainan Hsien (TW)

(73) Assignee: Applied Research Laboratories, National Center for High-Performance Computing, Hsinchu (TW)

( * ) Notice: Subject to any disclaimer, the term of this patent is extended or adjusted under 35 U.S.C. 154(b) by 231 days.

(21) Appl. No.: 11/269,539

(22) Filed: Nov. 9, 2005

(65) Prior Publication Data

US 2007/0103938 A1    May 10, 2007

(51) Int. Cl.
*F21V 7/04* (2006.01)
(52) U.S. Cl. ........................ 362/617; 362/331; 362/619
(58) Field of Classification Search ................ 362/330, 362/331, 606, 615, 617, 619, 620, 626
See application file for complete search history.

(56) References Cited

U.S. PATENT DOCUMENTS 6,629,764 B1    10/2003    Uehara 6,755,545 B2    6/2004    Lee
7,195,389 B2 *    3/2007    Parker et al. ............... 362/606

FOREIGN PATENT DOCUMENTS

TW          575759          2/2004

* cited by examiner

*Primary Examiner*—John Anthony Ward
(74) *Attorney, Agent, or Firm*—Rosenberg, Klein & Lee

(57) ABSTRACT

A light guide plate having micro-reflectors is to increase luminance of the light guide plate by changing light route. The light guide plate includes an incidence plane, an illuminating plane, and a bottom. Each of the micro-reflectors is disposed at the bottom and intersected with the light guide plate in a direction heading for a recess provided at the bottom of the light guide plate, and comprises a light reflection plane located between the incidence plane and the illuminating plane to define an angle θ. The light reflection plane is an arc quadrilateral or a sector when observed from top of the illuminating plane. The arc quadrilateral has two concentric arc sides parallel with each other.

18 Claims, 28 Drawing Sheets

LIGHT GUIDE PLATE HAVING MICRO-REFLECTORS

BACKGROUND OF THE INVENTION (a) Field of the Invention

The present invention relates to a light guide plate having micro-reflectors applied on the backlight module of a liquid crystal display, and more particularly, to one that has an arc or sectorial recess at the bottom of the light guide plate to increase luminance of the light guide plate.

(b) Description of the Prior Art

Referring to FIG. 1 of the accompanying drawings for a schematic view of a micro-reflector 2 of a light guide plate 1 of the prior art, the micro-reflector 2 with rough surface is created by using the etching method on a bottom 12 of the smooth light guide plate 1. Rays of light 50 continuing to convey through the surface of the micro-reflector 2 create reflected rays 51 or refracted rays 52 of light in scattering fashion. The reflected rays 51 of light pass through an illuminating plane 11 of the light guide plate 1 when the angle of incidence of the reflected rays 51 is smaller than the critical angle; or are fully reflected back into the light guide plate 1 to continue passing on if the angle of incidence is greater than the critical angle.

FIG. 2 interprets coordinates illustrated in FIG. 3(a). FIG. 3(a) is a radar view of illuminating intensity of the rays of light leaving the illuminating plane 11 of the light guide plate 1 of the prior art. Wherein, the abscissa indicates a horizontal angle (HA) with the movement of angle turns from a normal direction 13 of the illuminating plane 11 into a direction 14 vertical to a light source 4; meanwhile, the ordinate indicates a vertical angle (VA). The movement of angle turns from the normal direction 13 of the illuminating plane 11 into a direction 15 in parallel with the light source 4. In FIG. 3(a), each closed curve represents a value of the illuminating intensity, which is defined as a luminous flux of each unit of a solid angle. There are ten closed curves as illustrated in FIG. 3(a), representing ten grades of illuminating intensity. As shown in FIG. 3(a), the distribution of the illuminating intensity from the light guide plate 1 of the prior art approximates the Lambertian distribution, i.e., the illuminating intensity indicates cosine distribution. When the illuminating intensity is converted into luminance value, the luminance value is equal in each direction.

Now referring to FIG. 3(b) for a perspective view of the illuminating intensity from the illuminating plane 11 of the light guide plate 1, the distribution of the illuminating intensity approximates spherical one, i.e., it resembles the Lambertian distribution to permit the observation changes of the illuminating intensity in angle or direction.

Furthermore, each of light guide plates as disclosed in Taiwan Patent Publication No. 575759, U.S. Pat. Nos. 6,629,764 and 6,755,545 is adapted with a linear light source. Each illuminating plane of the latter US patents makes in a wave form while each micro-reflector disclosed in all three citations is originated from a conic form of concave disposed on the bottom of the light guide plate. The micro-reflector of Taiwan Patent Publication No. 575759 is a semi-spherical or triangle cone, and a triangle when viewed sideways; the micro-reflector of U.S. Pat. No. 6,629,764, as indicated in its side view, is two consecutive triangles, similar to a capitalized letter M. The bottom of the light guide plate in the disclosed embodiment includes a slope. The micro-reflector in U.S. Pat. No. 6,755,545 is a single cone.

In general, rays of light reflected from the hollow inside of a conic form of the micro-reflector of a light guide plate are prone to scatter and prevent from easy concentration.

SUMMARY OF THE INVENTION

The primary purpose of the present invention is to provide a light guide plate having micro-reflectors. Each of the micro-reflectors is disposed in an arc quadrilateral or a sector recess on the bottom of the light guide plate so to promote rays of light to radiate towards an illuminating plane of the light guide plate for increasing luminance of the light guide plate.

To achieve the purpose, the light guide plate includes an incidence plan, an illuminating plane, and a bottom. Light from a light source enters into the light guide plate from the incidence plane and leaves from the illuminating plane. The bottom is located on the opposite side of the illuminating plane, and the micro-reflectors are disposed on the bottom. Each of the micro-reflectors is a recess in the light guide plate intersected with the light guide plate and includes a light reflection plane that is located between the incidence plane and the illuminating plane to define an angle θ with the bottom of the light guide plate. The shape of the micro-reflector when viewed from top of the illuminating plane is an arc quadrilateral or a sector. The arc quadrilateral has two arc sides concentrically in parallel with each other.

Furthermore, each of the micro-reflectors includes a rear light pervious plane, two light pervious side planes, and a hollowed plane. The rear light pervious plane is abutted to the light reflection plane and farther from the incidence plane of the light guide plate in relation to the light reflection plane, and is vertical to the bottom of the light guide plate. Both light pervious side planes are respectively abutted to both sides of the light reflection plane and vertical to the bottom of the light guide plate. The hollowed plane is the recess on the bottom of the light guide plate.

The light reflection plane of the arc quadrilateral is cut from a sectional cone or an elliptic cone having a wide upper part and a narrow lower part with its center located at where nearer to the incidence plane. The cut is made for an angle β from the center of the sectional cone or the elliptic cone to come up with a light reflection plane with β as its central angle.

Alternatively, the light reflection plane of the arc quadrilateral is cut from a sectional cone or an elliptic cone having a narrow upper part and a wide lower part with its center located at where nearer to the rear light pervious plane. The cut is made for an angle β from the center of the sectional cone or the elliptic cone to come up with a light reflection plane with β as its central angle.

The light reflection plane of the sector is cut from a cone or an elliptic cone having a wide upper part and a narrow lower part with its center located at where nearer to the incidence plane. The cut is made for an angle β from the center of the cone or the elliptic cone to come up with a light reflection plane with β as its central angle.

Alternatively, the light reflection plane of the sector is cut from a cone or an elliptic cone having a narrow upper part and a wide lower part with its center located at where nearer to the rear light pervious plane. The cut is made for an angle β from the center of the cone or the elliptic cone to come up with a light reflection plane with β as its central angle.

Wherein, the side sectional shape of the light reflection plane is selected from a straight line, a concave curve, or a convex curve. It is to be noted that the micro-reflector of the light guide plate in each preferred embodiment of the present invention is capable of reflecting and locally focusing the light to effectively promote the luminance of the light guide plate.

BRIEF DESCRIPTION OF THE DRAWINGS

FIG. 5 (b) is a top view showing the construction of the micro-reflector of the first preferred embodiment of the present invention.

FIG. 5 (c) is a sectional view showing the construction of the micro-reflector of the first preferred embodiment of the present invention.

FIG. 6 (b) is a side view showing the light reflection plane cut from a sectional conic plane for supplementary explanation of the present invention.

FIG. 8 (b) is a side view of a light transport behavior in the micro-reflector.

FIG. 8 (c) is a side view of another light transport behavior in the micro-reflector.

FIG. 8 (d) is a side view of another light transport behavior yet in the micro-reflector.

FIG. 8 (e) is a front view of another light transport behavior yet in the micro-reflector.

FIG. 9 (b) is a perspective view of the illuminating intensity of the light emitted from the light guide plate of the first preferred embodiment of the present invention.

DETAILED DESCRIPTION OF THE PREFERRED EMBODIMENTS

Figure 1:
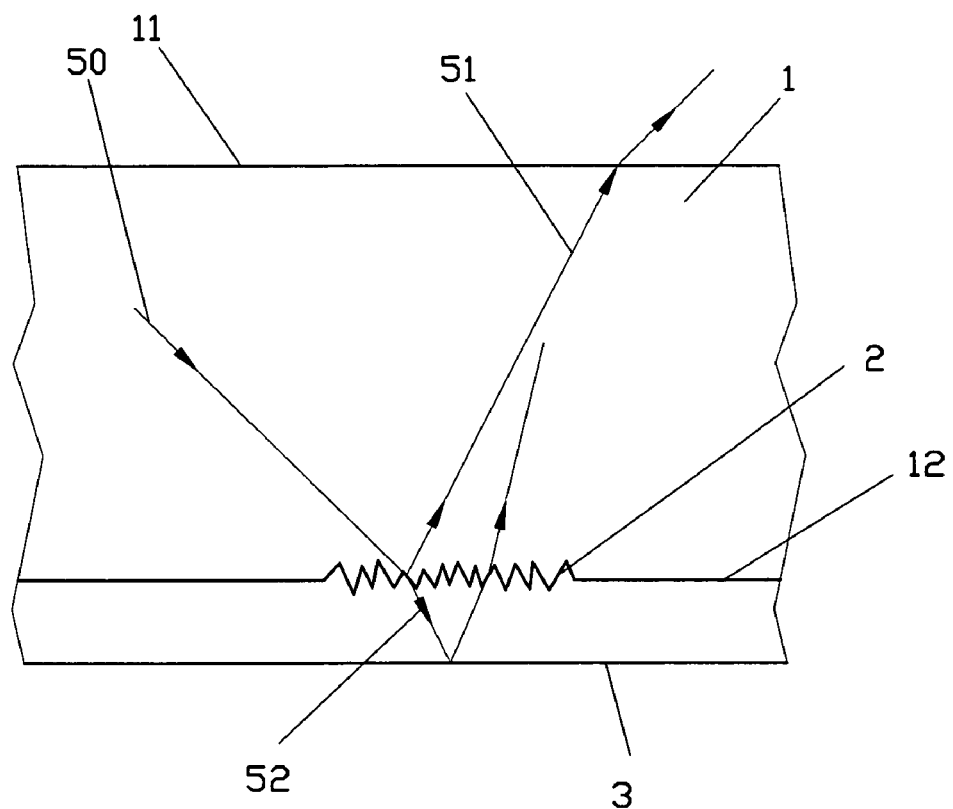
FIG. 1 is a schematic view of a light guide plate having micro-reflectors of the prior art.
Figure 2:
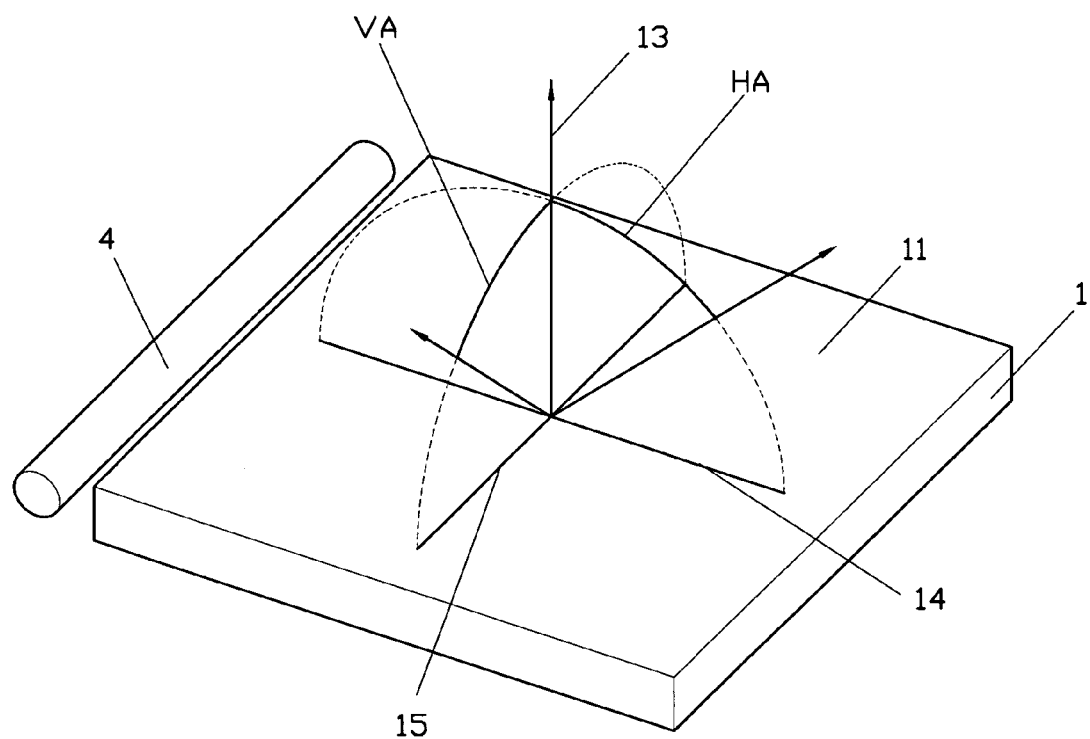
FIG. 2 is a schematic view of light emitted from an illuminating plane of the light guide plate of the prior art (describing the coordinates illustrated in FIG. 3).
Figure 3A:
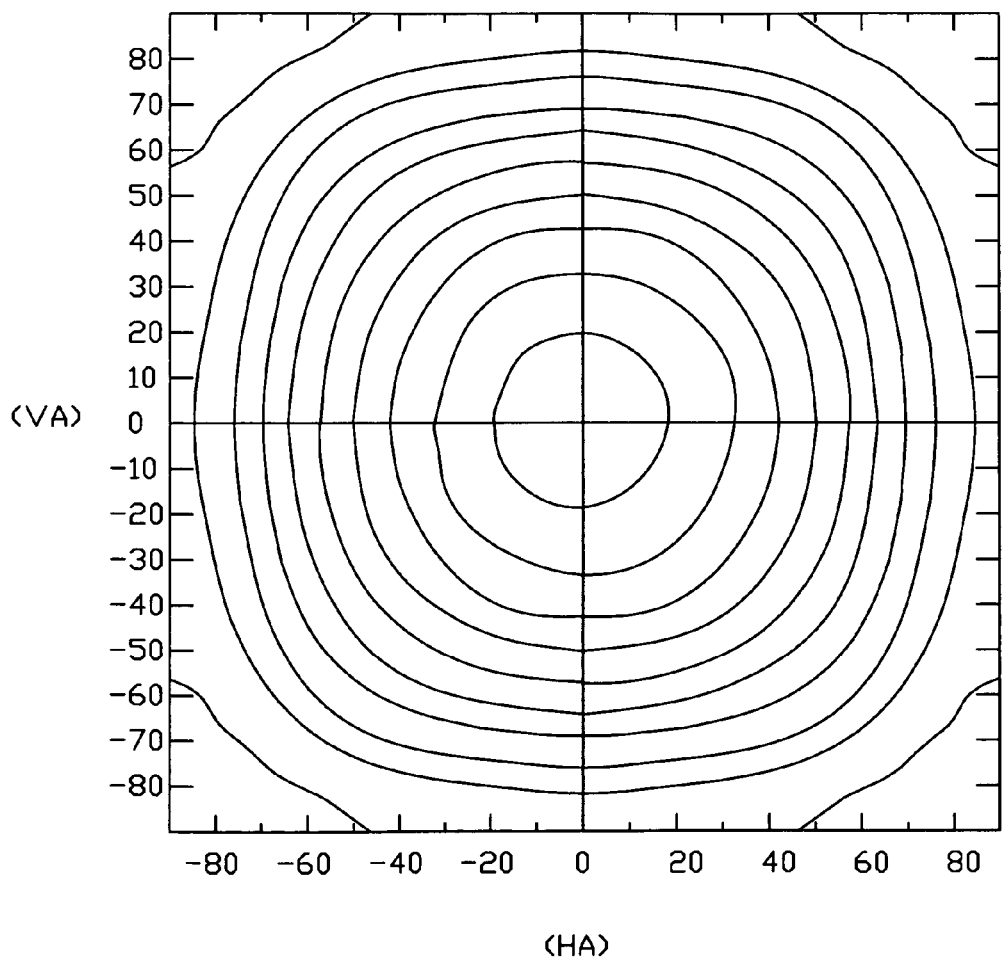
FIG. 3 (a) is a radar view of the illumination intensity from the illuminating plane of the light guide plate of the prior art FIG. 3 (b) is a perspective view of the illumination intensity from the illuminating plane of the light guide plate of the prior art.
Figure 3B:
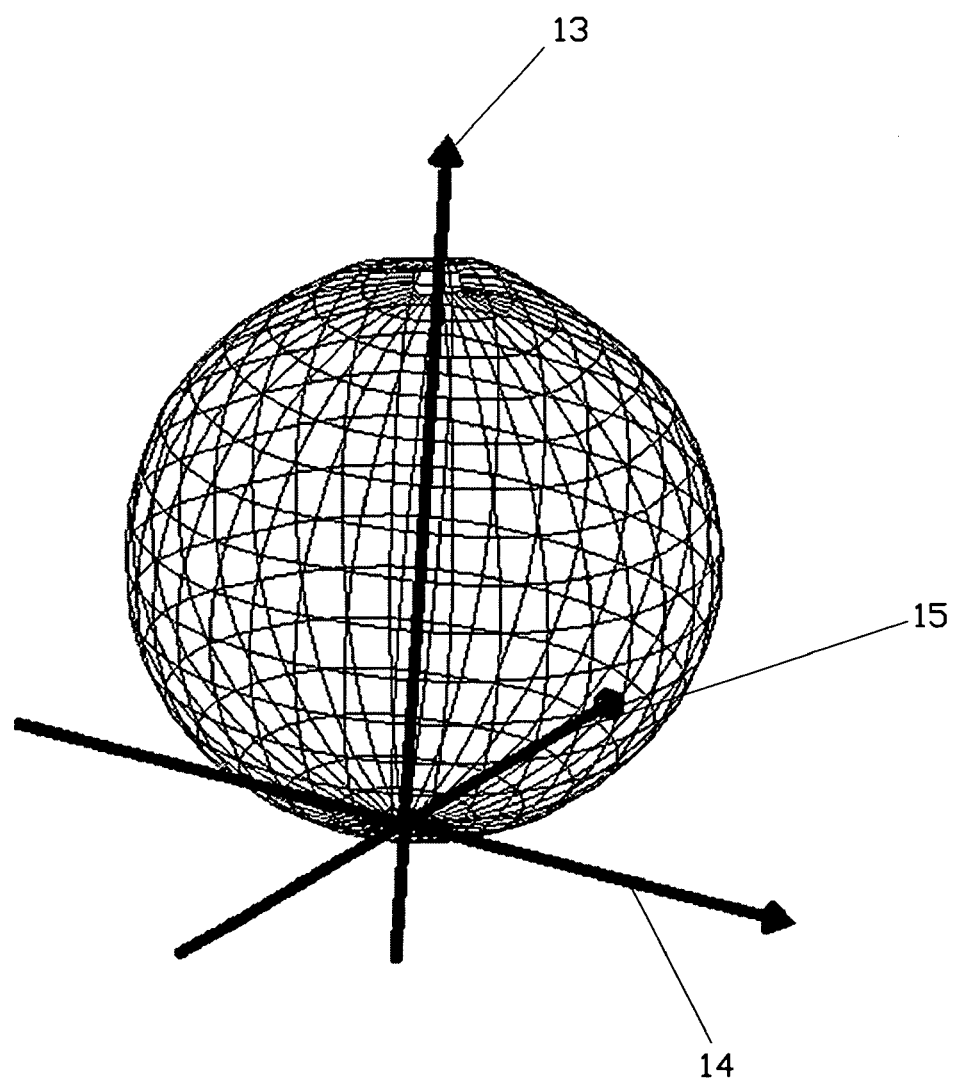
Figure 4:
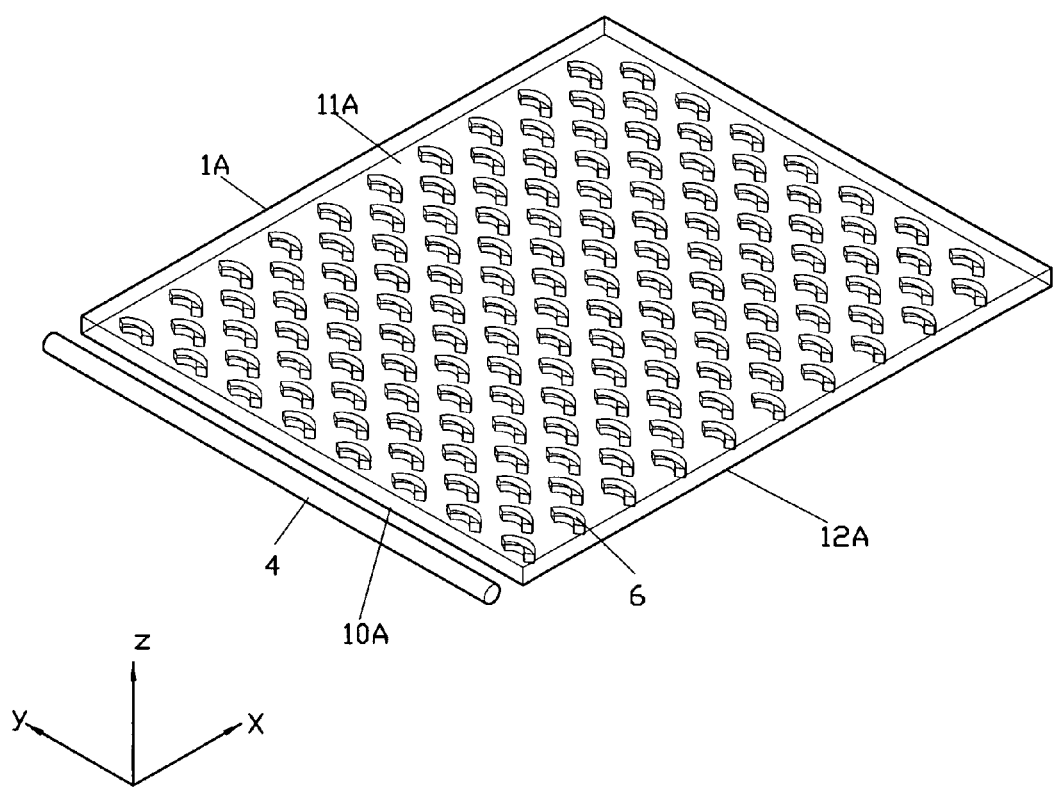
FIG. 4 is a schematic view of micro-reflectors of a preferred embodiment of the present invention applied in a light guide plate.

Referring to FIG. 4 for a schematic view of a distribution of micro-reflectors 6 of a first preferred embodiment of the present invention on a light guide plate 1A, rays of light emitting from a light source 4 radiate into an incidence plane 10A of the light guide plate 1A. Each micro-reflectors 6 is disposed in an arc recess on a bottom 12A of the light guide plate 1A to admit the rays of light to leave an illuminating plane 11A to increase luminance of the light guide plate 1A.

Figure 5A:
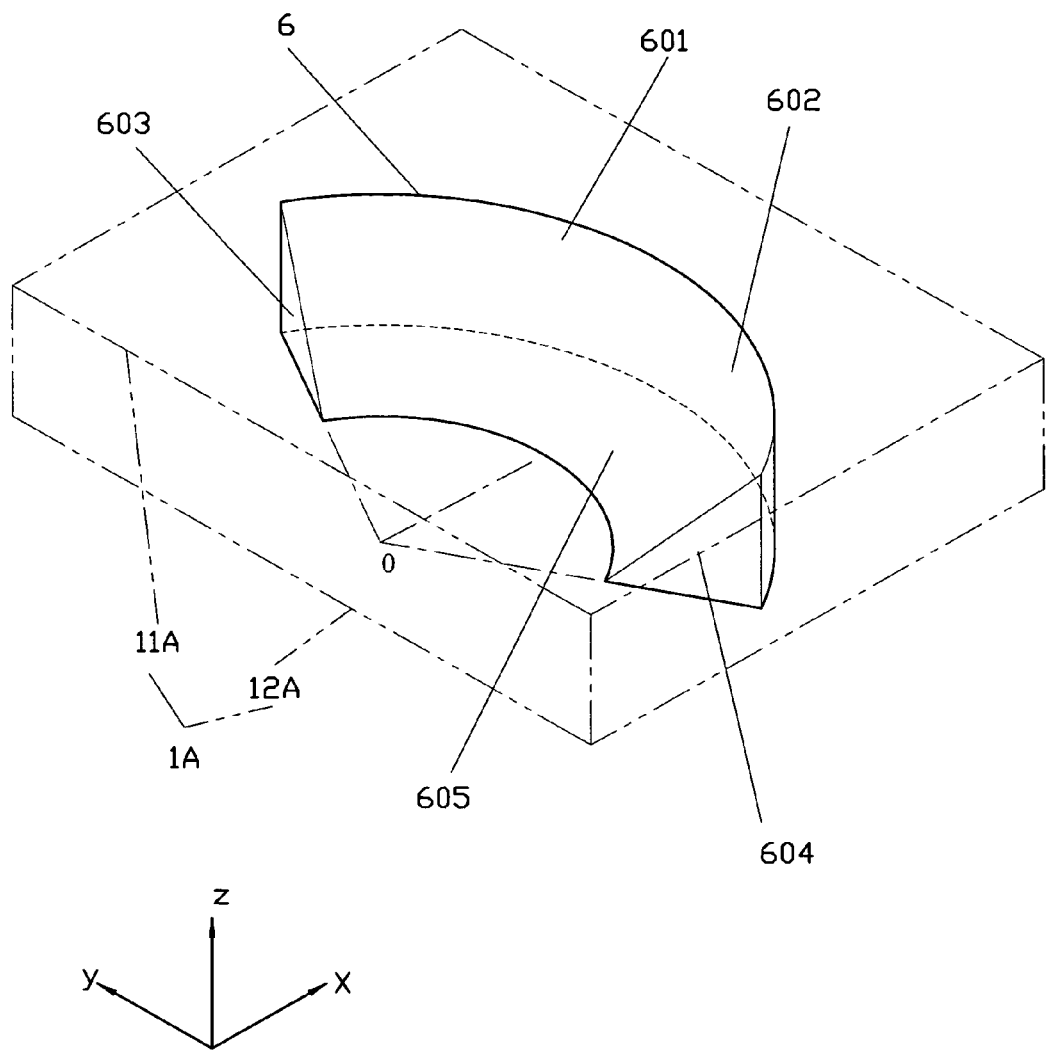
FIG. 5 (a) is a schematic view showing a construction of the micro-reflector of the first preferred embodiment of the present invention.
Figure 5B:
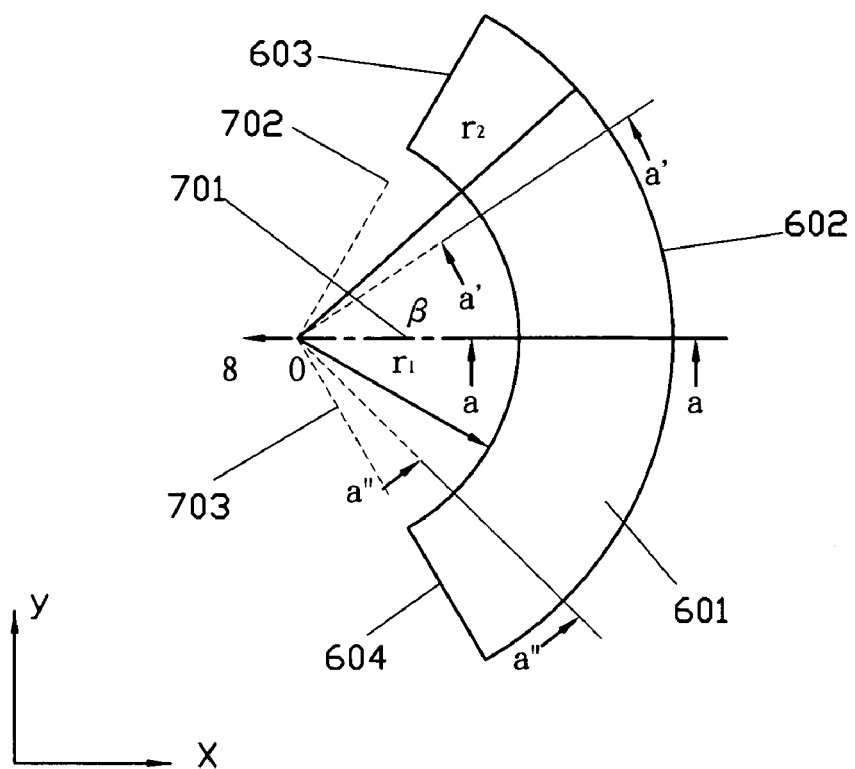
Figure 5C:
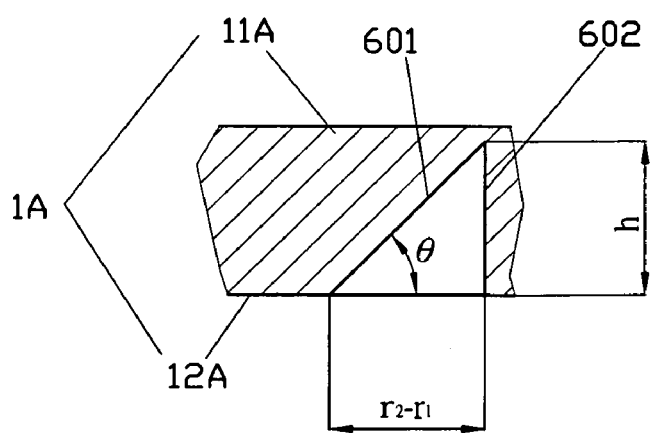
Figure 6A:
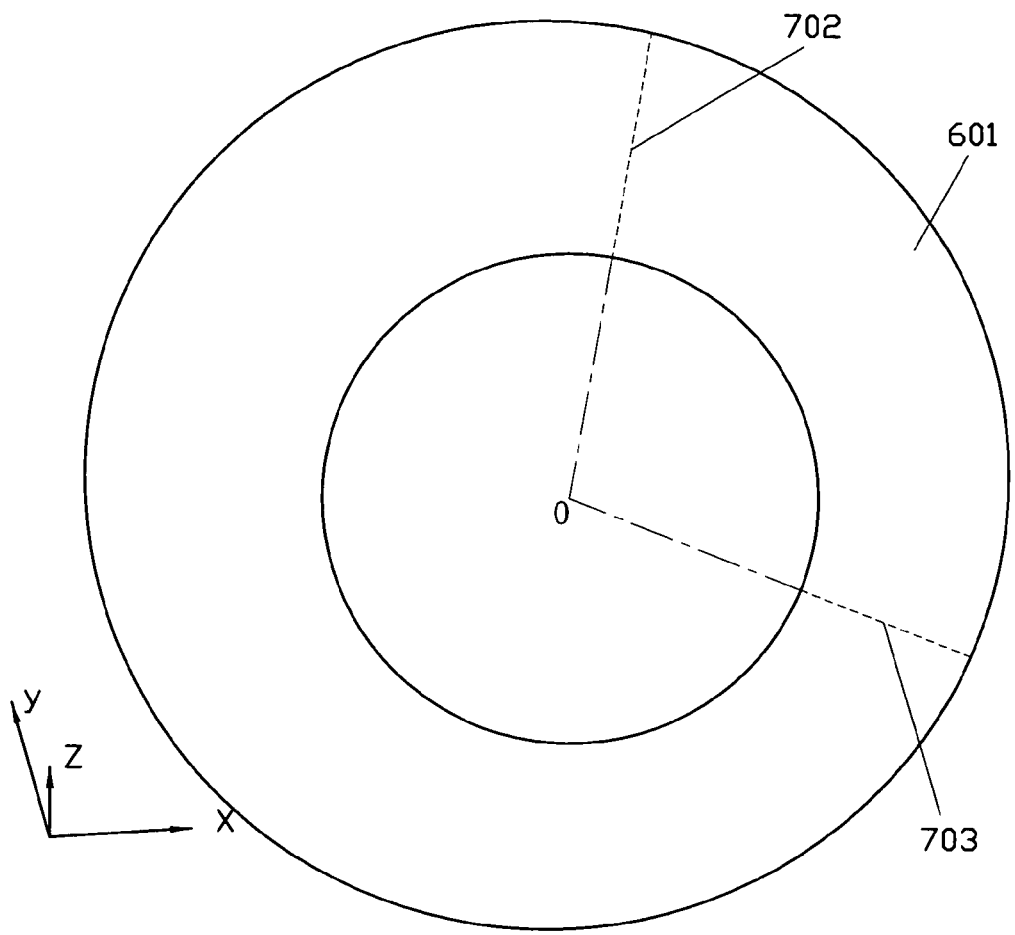
FIG. 6 (a) is schematic view showing a light reflection plane cut from a sectional conic plane for supplementary explanation of the present invention.
Figure 6B:
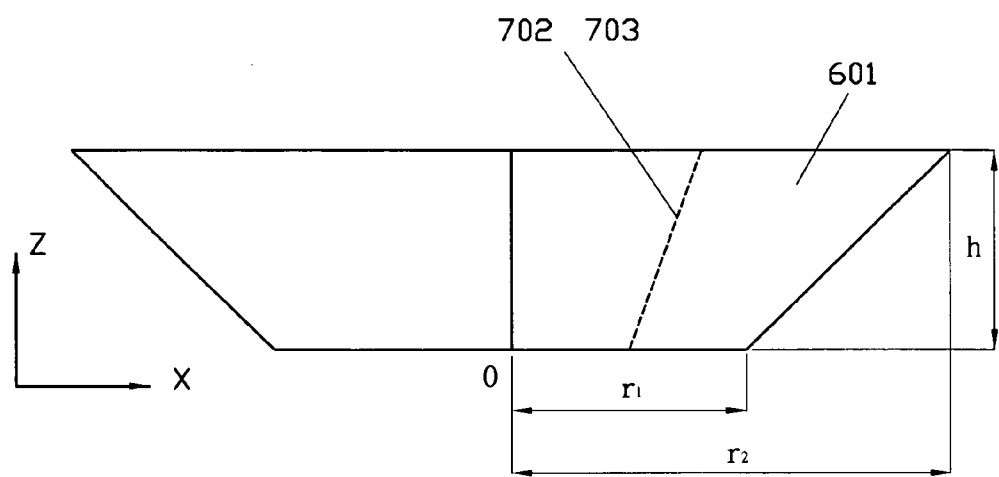
Figure 7:
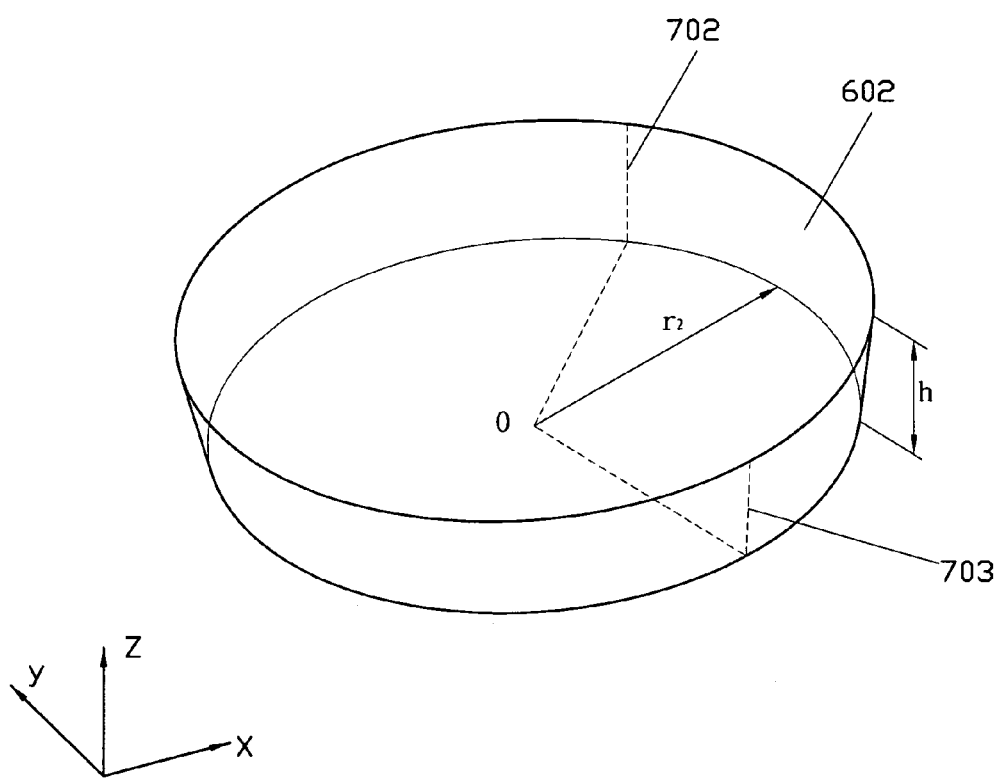
FIG. 7 is a schematic view showing a rear light pervious plane cut from a cylindrical surface for supplementary explanation of the present invention.
Figure 8A:
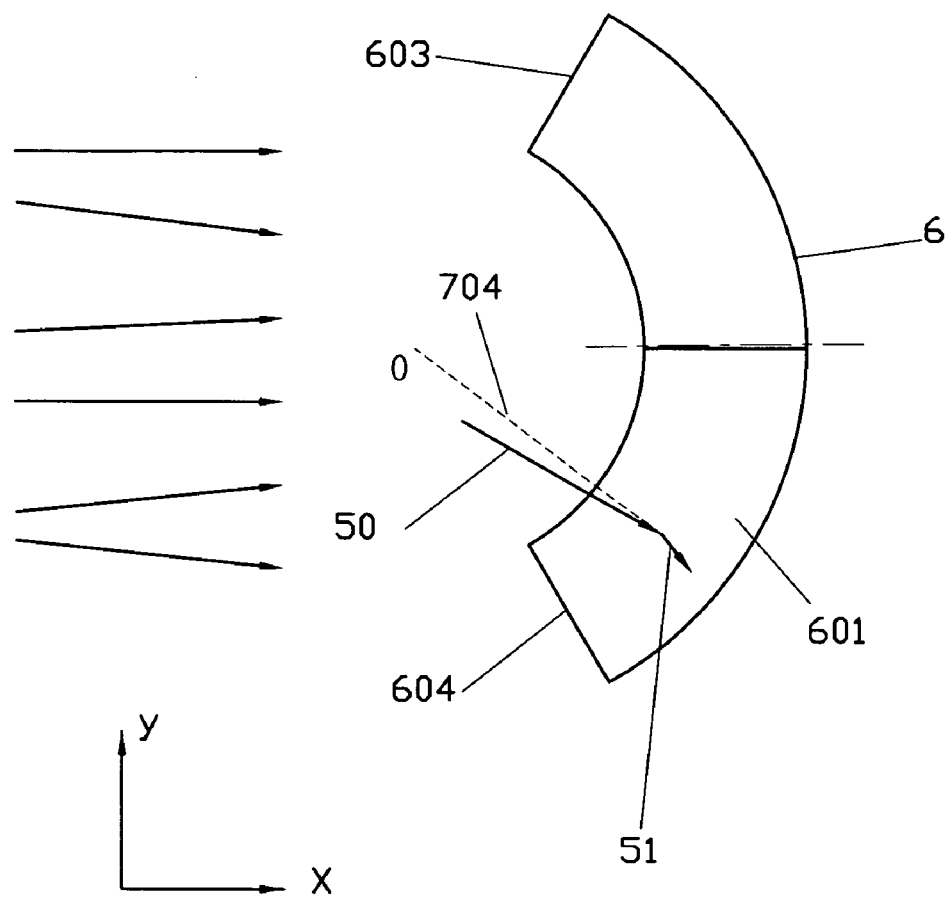
FIG. 8 (a) is a schematic view showing a light transport behavior in the micro-reflector.
Figure 8B:
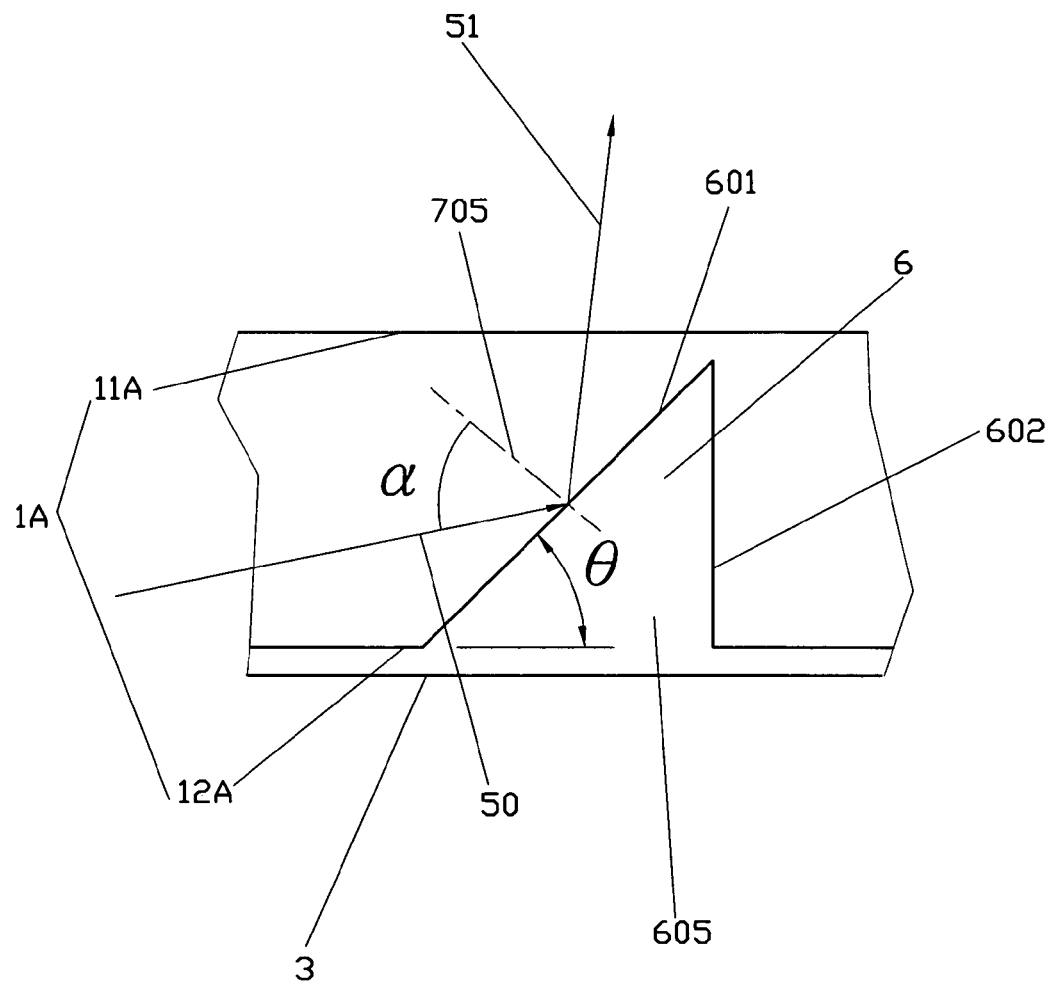
Figure 8C:
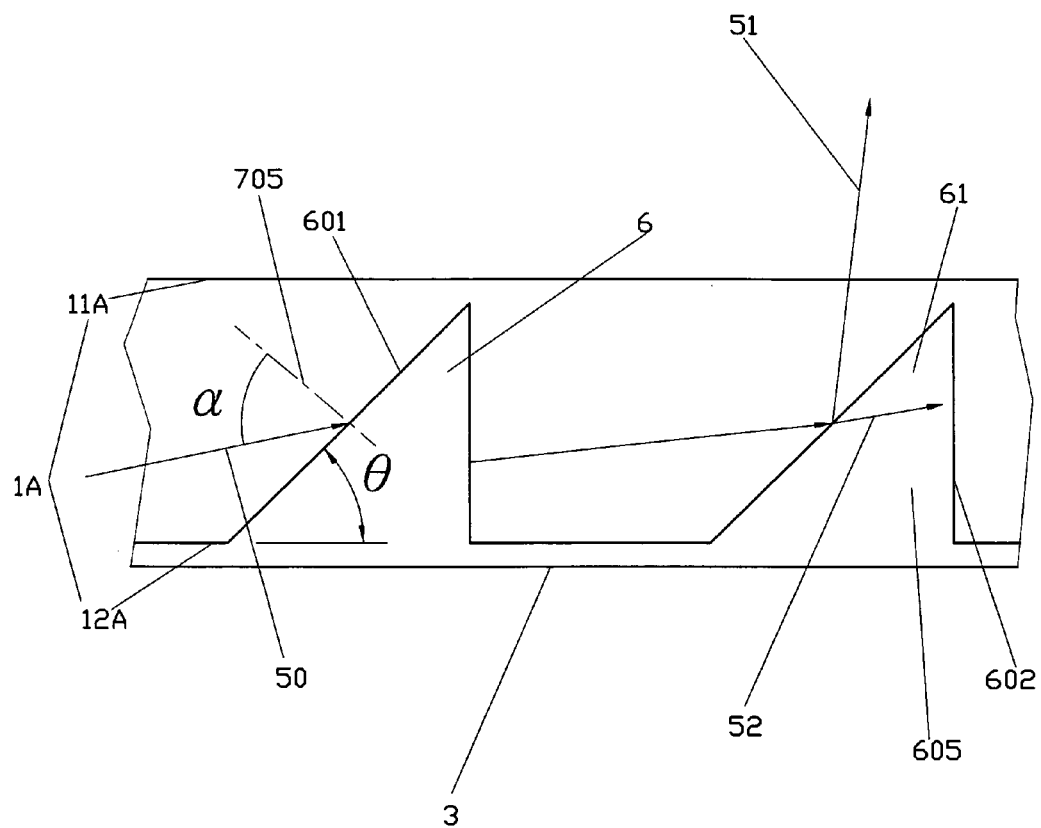
Figure 8D:
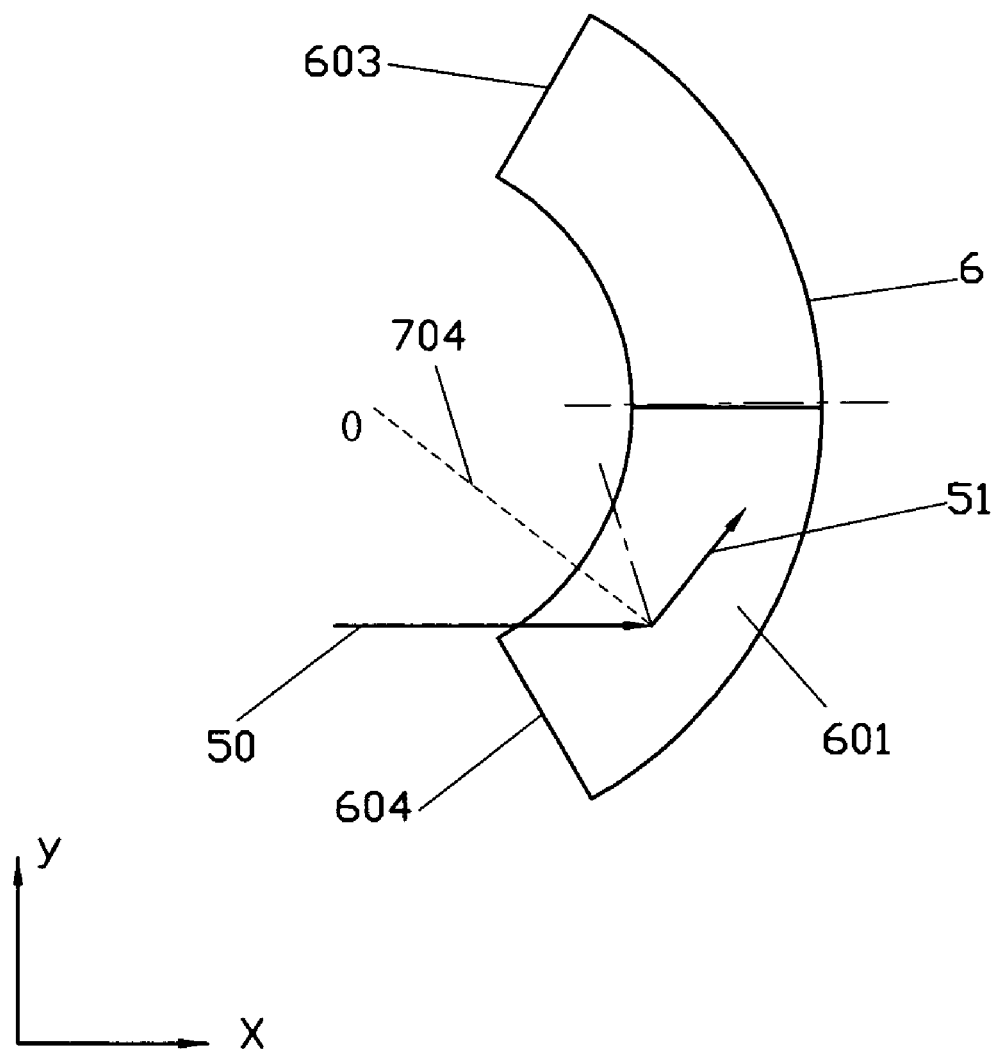
Figure 8E:
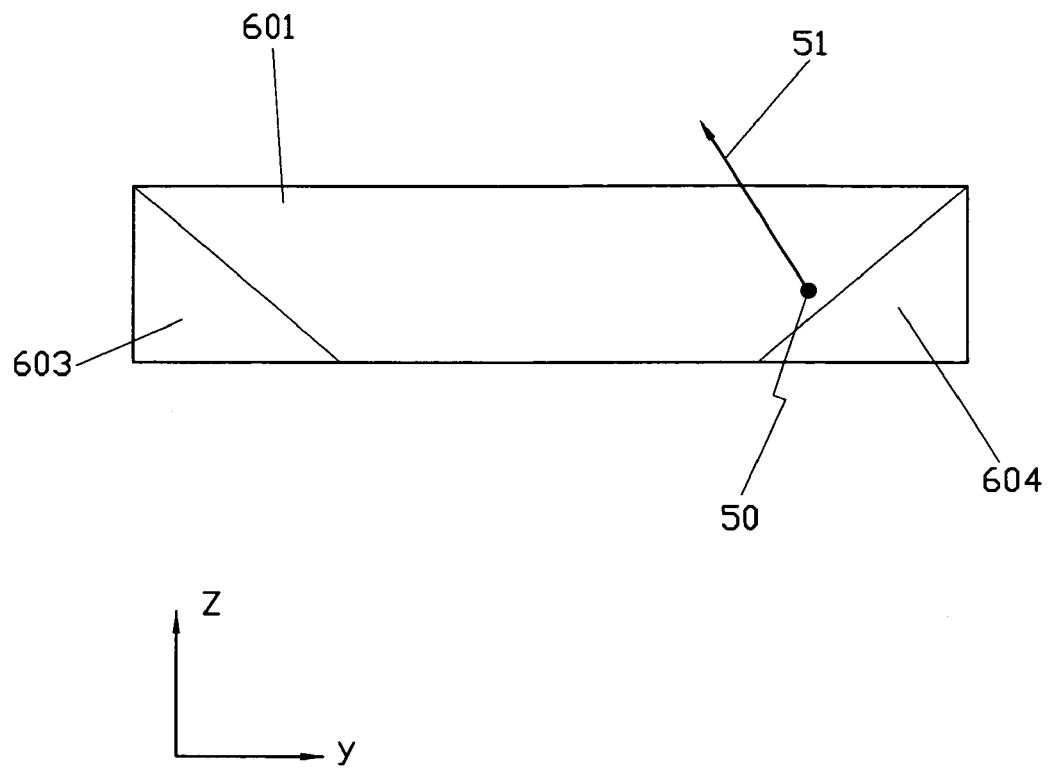

Now referring to FIGS. 5(a) through 5(c) for a perspective view, a side view and a sectional view of the micro-reflector 6, the micro-reflector 6 is an arc recess and comprises a light reflection plane 601, a rear light pervious plane 602, two light pervious side planes 603, 604, and a hollowed plane 605. The light reflection plane 601 is a sectorial camber, cut along two cutting lines 702, 703 from a sectional conic plane as illustrated in FIG. 6. Radii and the height of the sectional cone are respectively designated by $r_1$ and $r_2$, and h. As illustrated in FIG. 5 (b), the cutting range commences from a sectional conic center "O" for an angle β with both cutting lines 702, 703 are in symmetrical to a central line 701 of the micro-reflector 6, i.e., the cutting angle β is dichotomized by the central line 701. The direction of the central line 701 toward the light reflection plane 601 is referred as a designated direction 8 for the micro-reflector 6. Both light pervious side planes 603, 604 are sections cut by the cutting lines 702, 703. The rear light pervious plane 602 is an arc camber. As illustrated in FIG. 7, the rear light pervious plane 602 is an arc camber cut along the two cutting lines 702, 703 from a cylindrical surface in radius $r_2$ and height h, wherein, the center of the cylinder and the conic center are located at the same position. The hollowed plane 605 is an arc and where the micro-reflector 6 creates the recess on the bottom 12A of the light guide plate 1A. As illustrated in FIG. 5 (b), the sectional view of the micro-reflector 6 in FIG. 5 (c) can be observed either viewed from a-a tangent plane, a'-a', or a"-a". Whereas the light reflection plane 601 is taken from a part of sectional conic plane, and the rear light pervious plane 602 is taken from a part of the cylindrical plane, all three sectional views are identical. An angle θ is defined by the light reflection plane 601 and the bottom 12A (i.e., the hollowed plane 605 as illustrated) of the light guide plate 1A. The angle θ controls variation of the light reflection plane 601 and affects the light transport behavior in the micro-reflector 6.

As illustrated in FIGS. 8(a) through 8(e) for schematic views showing light transports in the micro-reflector 6. The light may transport in any direction in the micro-reflector 6. That's why the micro-reflector 6 is made in an arc shape so that there won't be too significant difference in the directions of rays of light radiate through the micro-reflector 6. When an incidence light 50 travels in a direction closer to a line 704 between the conic center "O" and the incidence point, the incidence light 50 arrives at the light reflection plane 601 of the micro-reflector 6, an incidence angle α is greater than 42°, a critical angle of the light guide plate 1A (the refraction ratio of the light guide plate is 1.49) to reflect the incidence light to where above the reflection plane 601, thus to increase the intensity of the illuminating light in a normal direction 13 as illustrated in FIGS. 8 (a) and 8 (b). When the incidence angle α is less than the critical angle 42° of the light guide plate 1A as illustrated in FIG. 8 (c), the light will pass through a first micro-reflector 6 and arrive at a second micro-reflector 61 through the rear light pervious plane 602, where the light is reflected to become reflection light 51 or passes through the second micro-reflector 61. In either case, both light transport behavior are sufficient to increase the intensity of the illuminating light in HA direction.

Now referring to FIGS. 8 (d) and 8 (e), when the direction of the incidence light 50 is away from the direction of the line 704 between the conic center "O" and the incidence point, the incidence light 50 upon arriving on the light reflection plane 601 will bounce back sideways to become the reflection light 51, thus to increase the intensity of the illuminating light in VA direction.

Figure 9A:
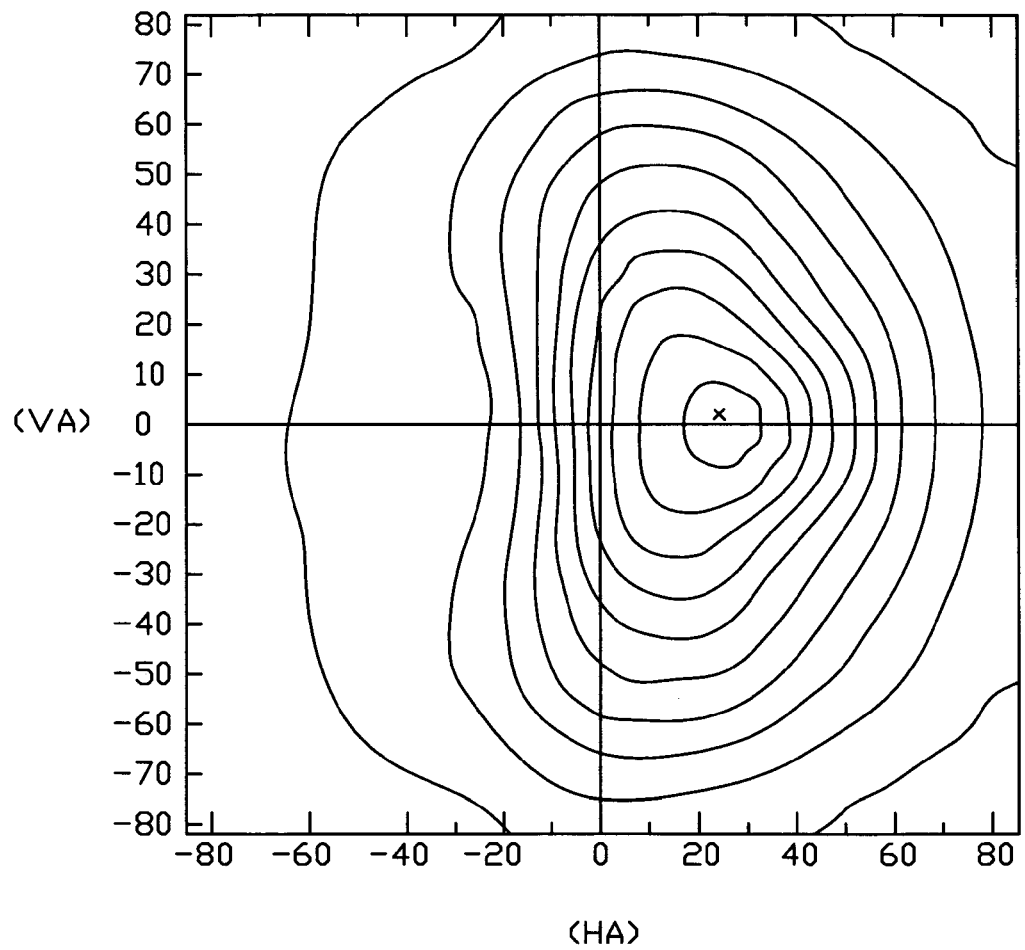
FIG. 9 (a) is a radar view of the illuminating intensity of the light emitted from the light guide plate of the first preferred embodiment of the present invention.
Figure 9B:
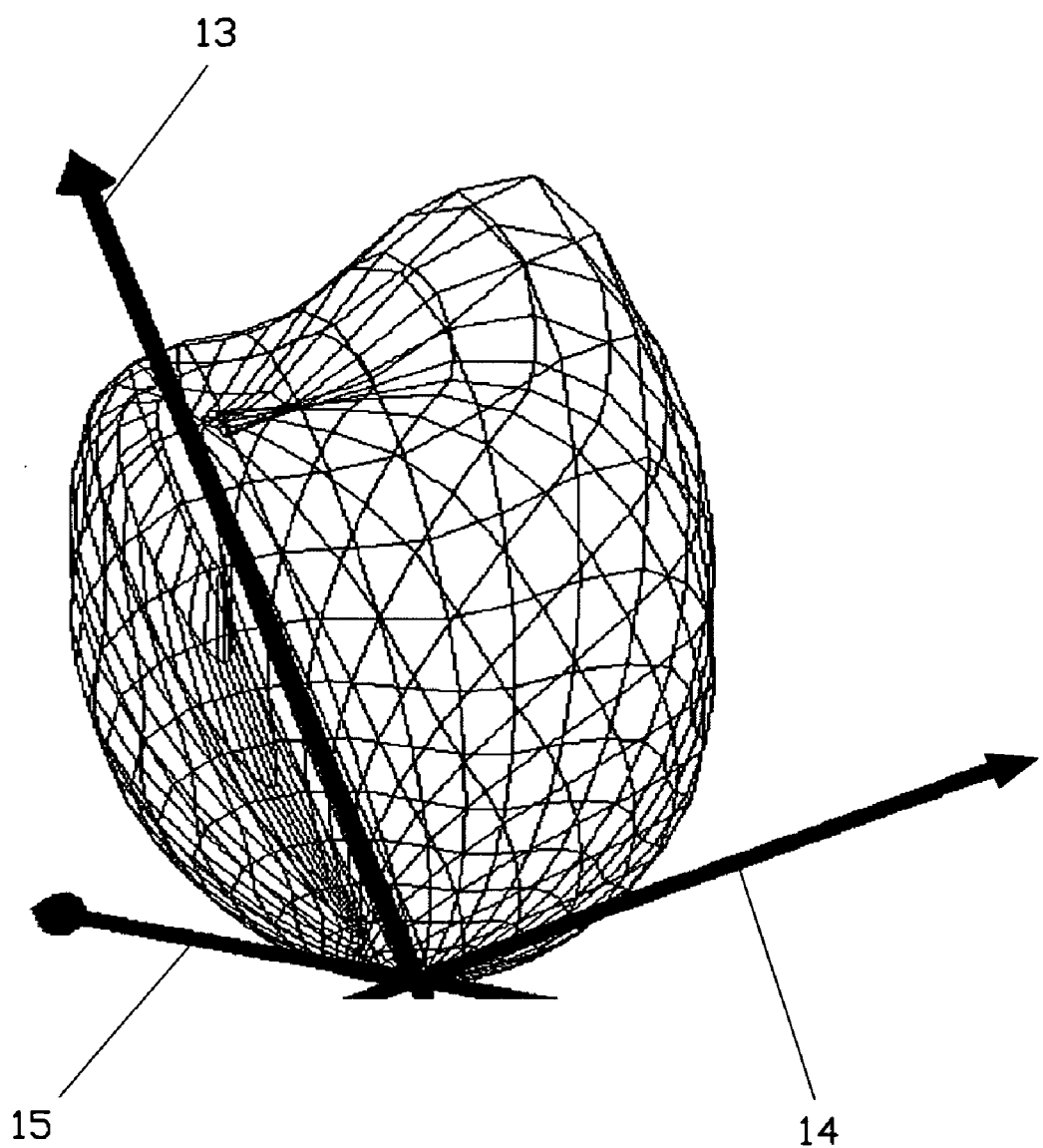

FIGS. 9(a) and 9(b) are a radar view and a perspective view of the illuminating light from the light guide plate 1A having the micro-reflectors 6 of the first preferred embodiment. The light enters from the light source 4 into the light guide plate 1A provided with the micro-reflectors 6 to contact the micro-reflectors 6 and transport in the direction 13 of the illuminating light at an angle essentially concentrating at HA=25° and VA=3°. The angle θ of elevation of the micro-reflector changes the illuminating angle and distribution of the light in HA direction and the central angle β controls the illuminating distribution of the light in VA direction.

Figure 10:
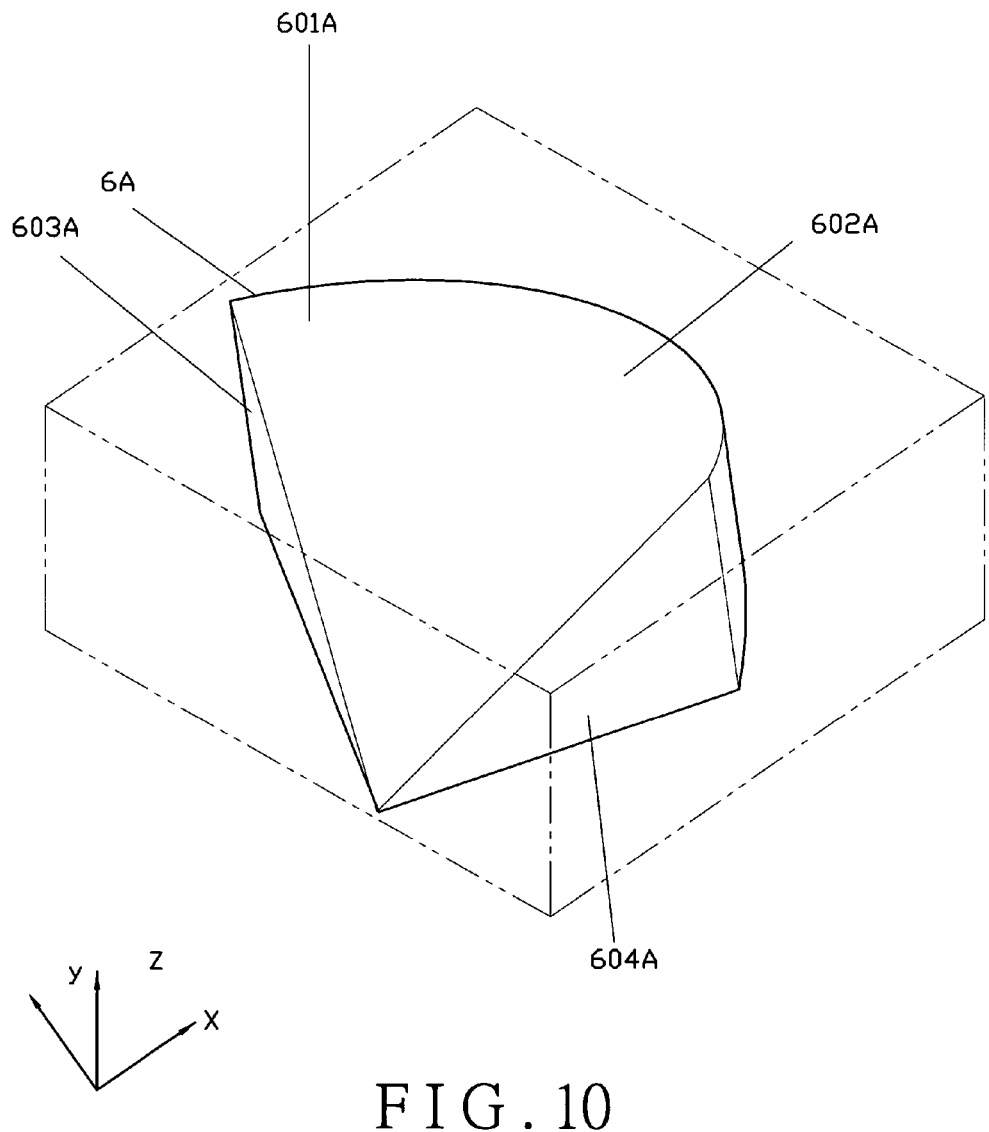
FIG. 10 is a schematic view showing a micro-reflector of a second preferred embodiment of the present invention.

In a second preferred embodiment as illustrated in FIG. 10, a micro-reflector 6A is a sector and includes a light reflection plane 601A, a rear light pervious plane 602A, two light pervious side planes 603A, 604A, and a hollowed plane 605A. The light reflection plane 601A is a sectorial camber taken from a cone.

Figure 11:
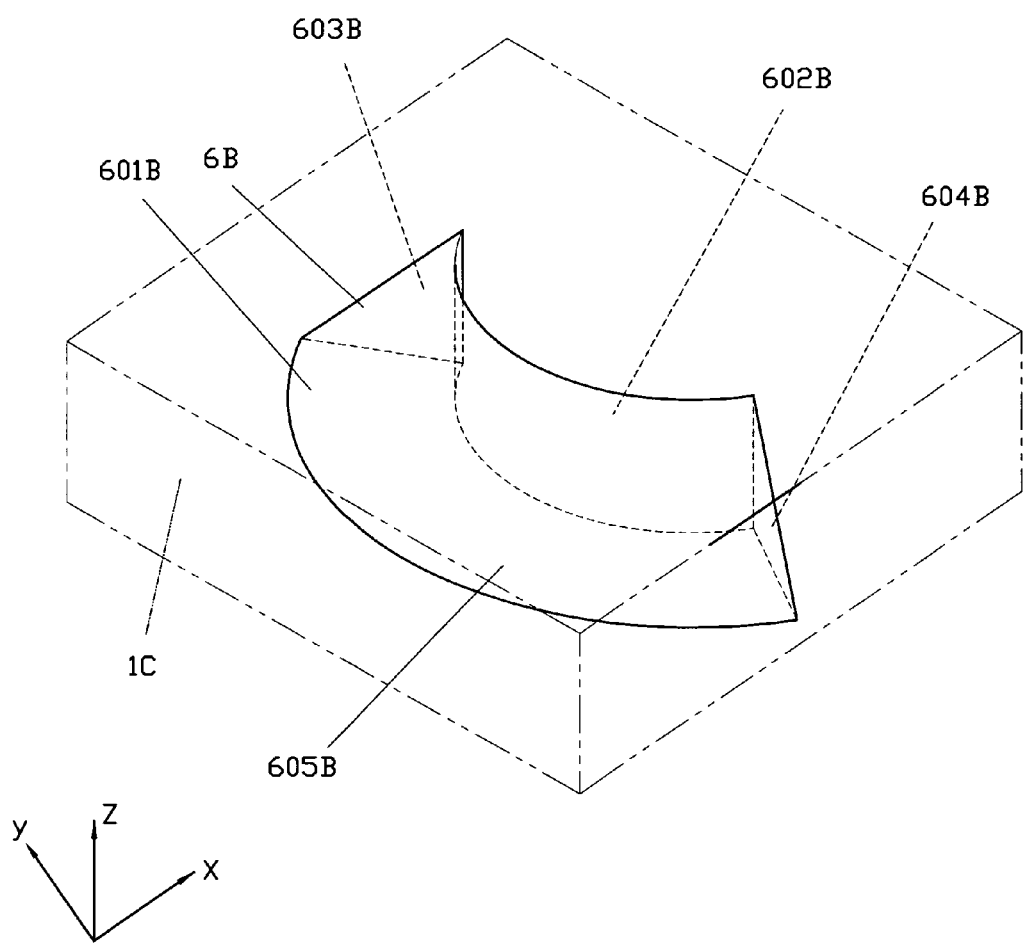
FIG. 11 is a schematic view showing a micro-reflector of a third preferred embodiment of the present invention.

FIG. 11 shows a construction of a micro-reflector 6B of a third preferred embodiment of the present invention. The micro-reflector 6B is an arc recess and includes a light reflection plane 601B, a rear light pervious plane 602B, two light pervious side planes 603B, 604B, and a hollowed plane 605B. The light reflection plane 601B is an arc camber and protrudes towards a light guide plate 1C. When viewed from the light guide plate 1C toward the direction of the hollowed plane 605B, the light reflection plane 601 B of the third preferred embodiment is taken from the sectional conic plane having a narrow upper part and a wide lower part, while the light reflection plane 601 of the micro-reflector 6 of the first preferred embodiment is taken from the sectional conic plane having a wide upper part and a narrow lower part.

Figure 12:
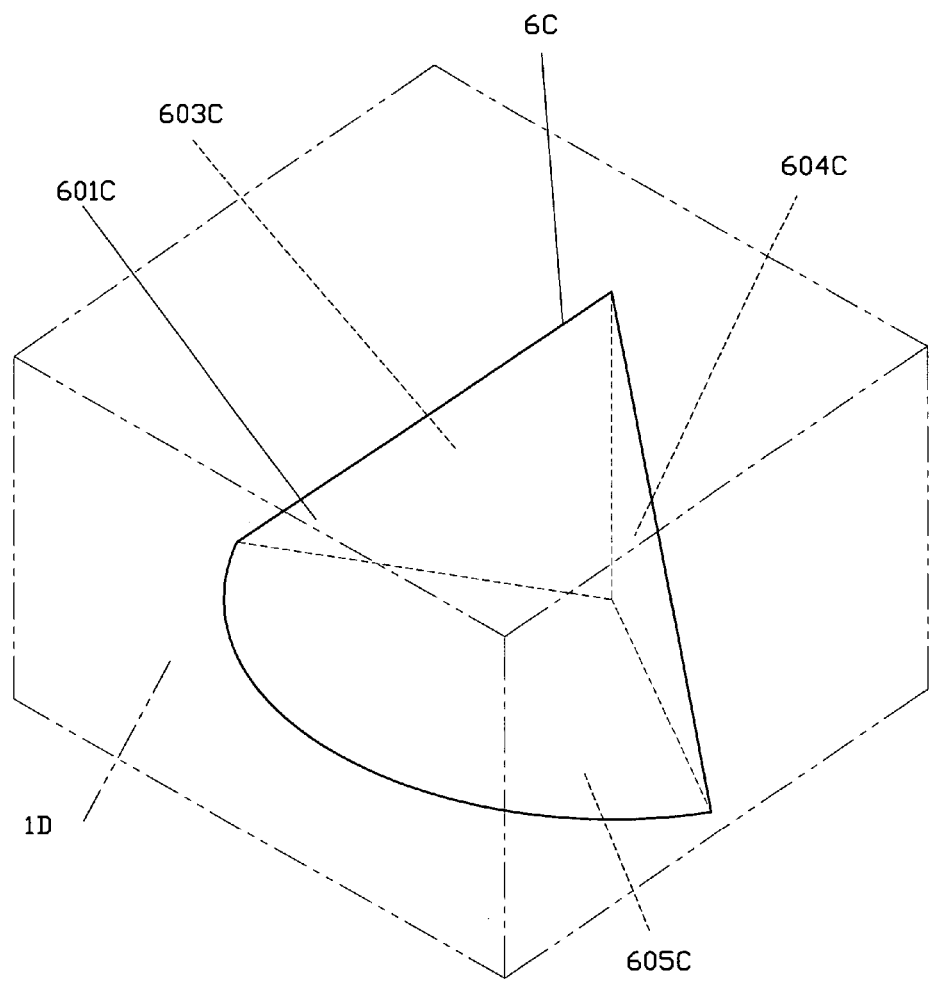
FIG. 12 is a schematic view showing a micro-reflector of a fourth preferred embodiment of the present invention.
Figure 12:
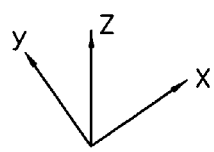

In a fourth preferred embodiment of the present invention as illustrated in FIG. 12, a micro-reflector 6C is a sectorial construction including a light reflection plane 601C, two light pervious side planes 603C, 604C, and a hollowed plane 605C. The light reflection plane 601C is a sectorial camber protruding toward a light guide plate 1D and does not have a rear light pervious plane since it is taken from a sharp cone.

Figure 13:
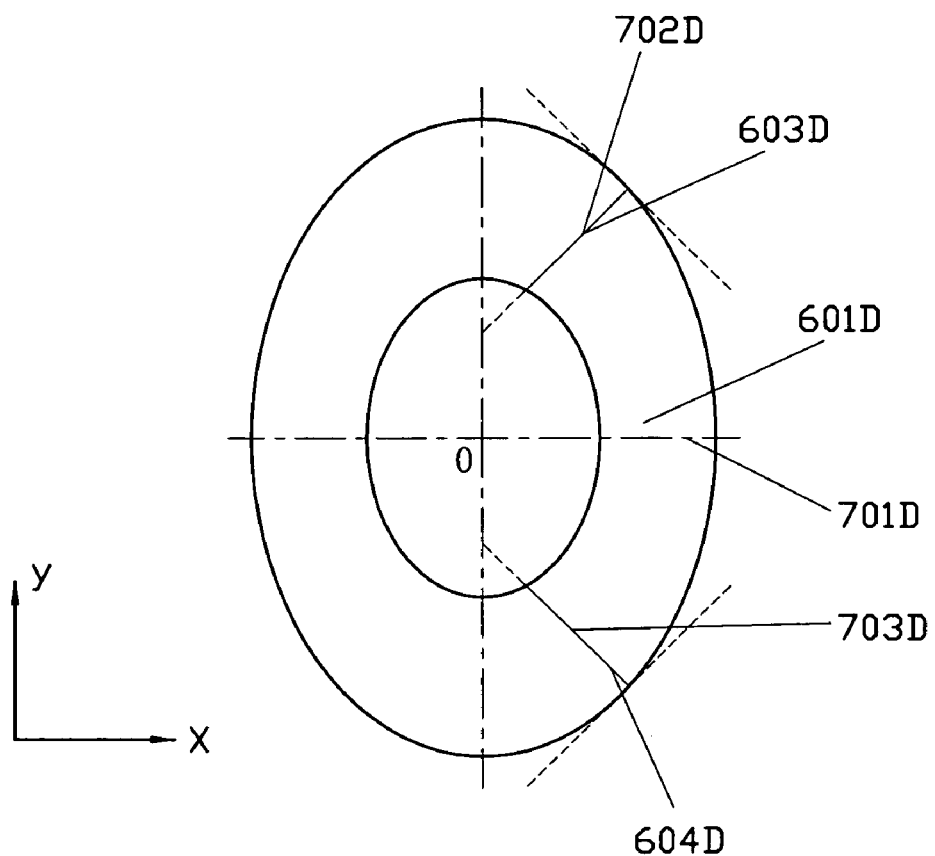
FIG. 13 is a top view of a micro-reflector of a fifth preferred embodiment of the present invention.

FIG. 13 is a top view of a micro-reflector 6D of a fifth preferred embodiment of the present invention. A light reflection plane 601D indicates an elliptic arc or sector. Two light pervious side planes 603D, 604D are plotted by two cutting lines 702D, 703D from an elliptic focus outwardly, and are vertical to tangents of the elliptic lines.

Figures 14, 15:
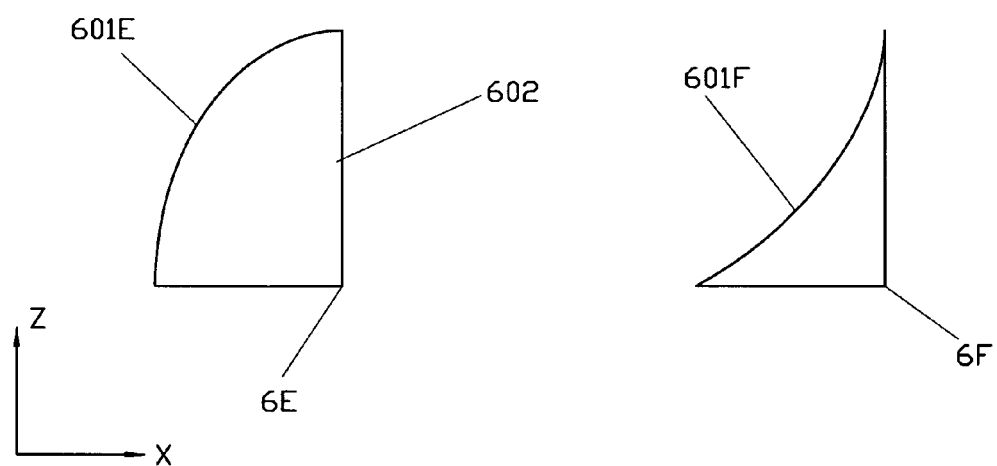
FIG. 14 is a side view of a micro-reflector of a sixth preferred embodiment of the present invention.
FIG. 15 is a side view of a micro-reflector of a seventh preferred embodiment of the present invention.

As illustrated in FIG. 14 for a side view of a micro-reflector 6E of a sixth preferred embodiment of the present invention, a light reflection plane 601E when observed sideways indicates a convex curve. As illustrated in FIG. 15 for a side view of a micro-reflector 6F of a seventh preferred embodiment of the present invention, a light reflection plane 601F when observed sideways indicates a concave curve.

When comparing the second through the seventh preferred embodiments with the first preferred embodiment, light transport distribution varies depending on the camber taken for each of the light reflection planes 601, and 601A~601F. In general, all the behaviors of light transport among the micro-reflectors 6, and 6A~6F are similar to contribute to promote luminance and consistence of the light guide plate.

Figure 16:
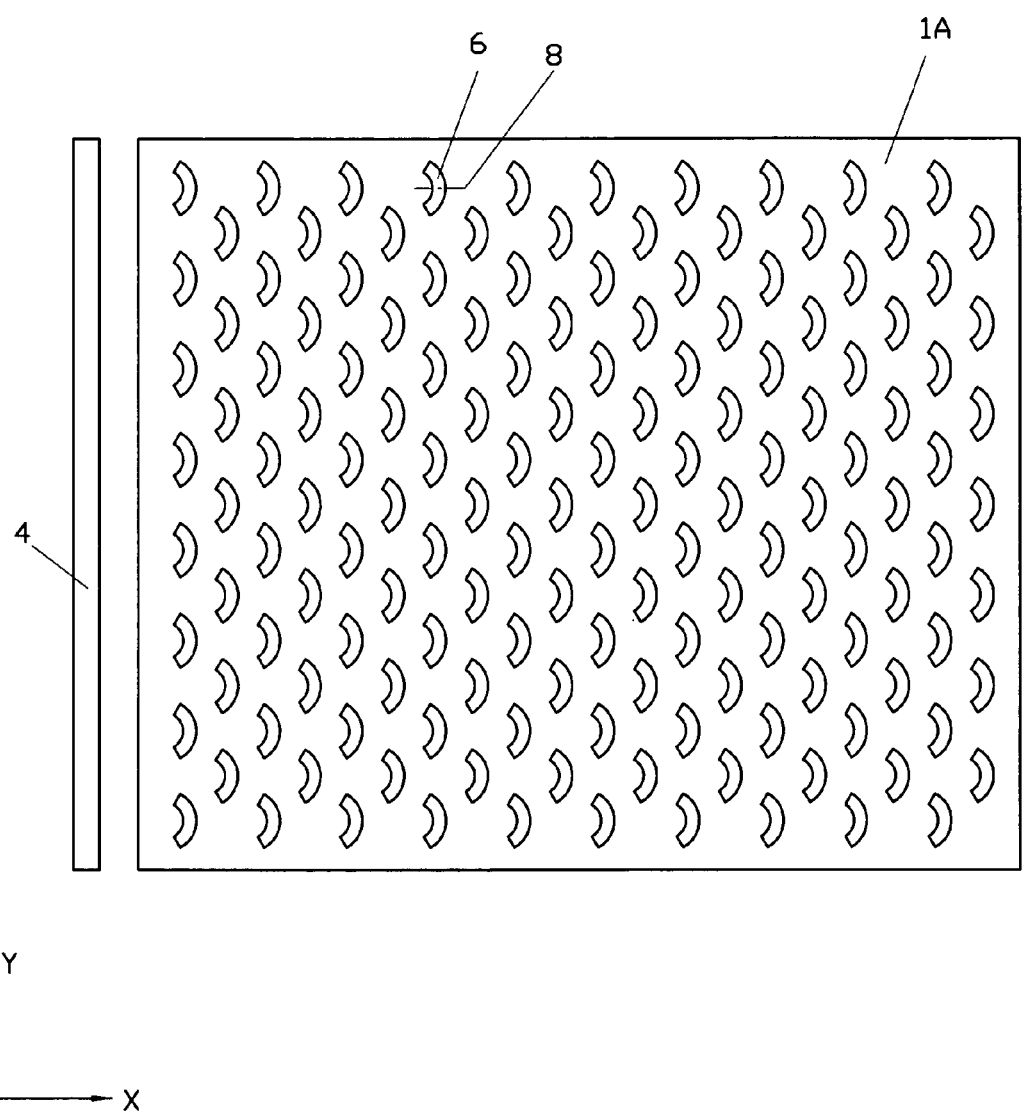
FIGS. 16, 17, 18, 19, 20, and 21 are top views of the distributions of the micro-reflectors on the light guide plate of the first preferred embodiment of the present invention.

FIGS. 16 through 21 are top views of the distribution of the micro-reflectors of the first preferred embodiment on the light guide plate. FIG. 16 is a top view taken from FIG. 4. The micro-reflectors 6 indicate regular distribution on the light guide plate 1A and head in the same direction 8 that faces the light source 4 to facilitate incidence of light to radiate into the micro-reflectors to increase luminance.

Figure 17:
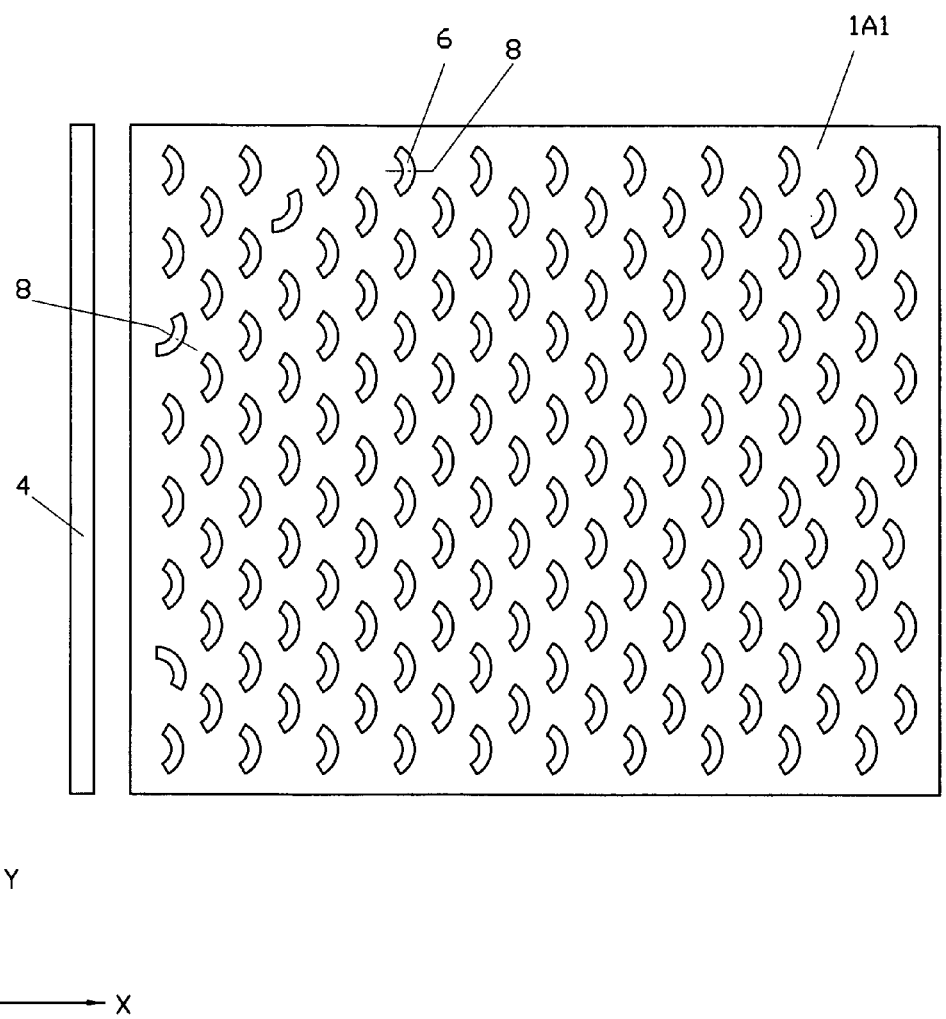

The micro-reflectors 6 also indicate regular distribution on a light guide plate 1A1 as illustrated in FIG. 17. Though they don't point at the same direction 8, they in generally tend to face in the direction of the light source 4 to achieve the same purpose of increasing luminance.

Figure 18:
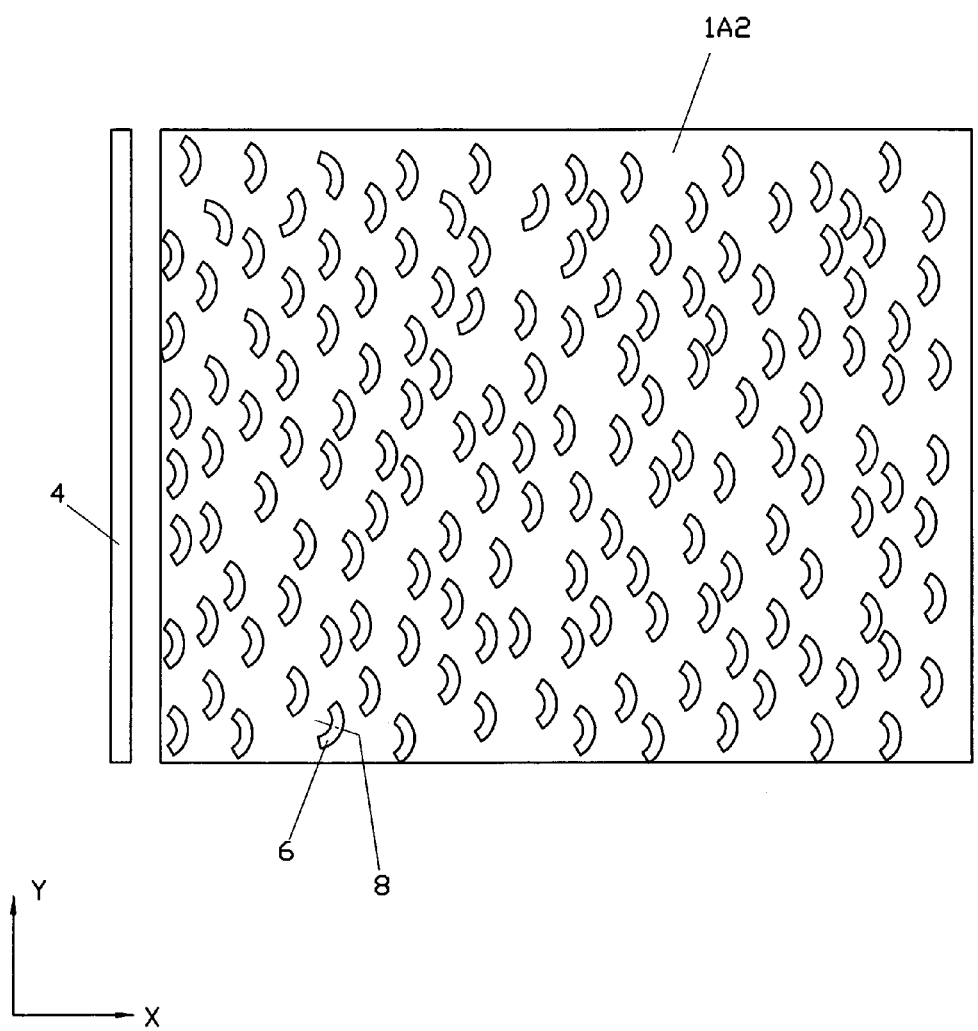

In FIG. 18, the micro-reflectors 6 are distributed at random on a light guide plate 1A2 heading for the same direction 8 toward the light source 4 to facilitate incidence of light to radiate into the micro-reflectors to increase luminance.

Figure 19:
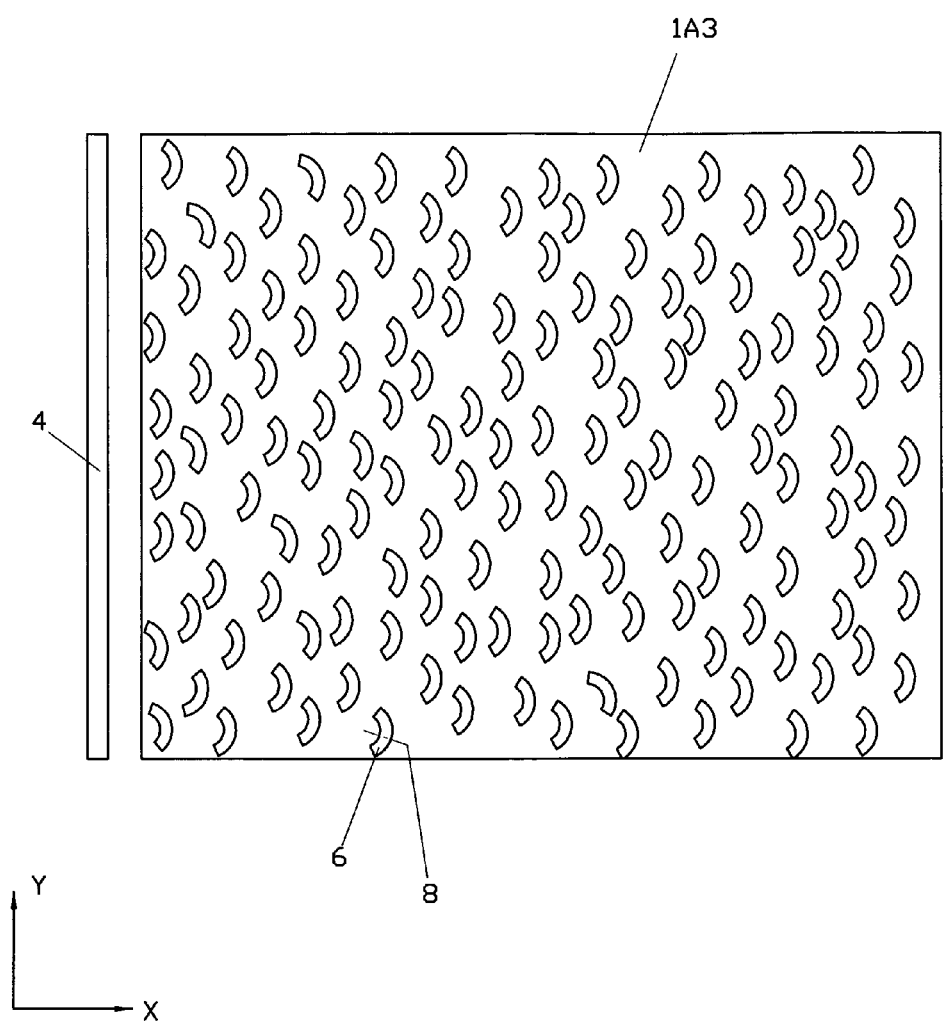

The micro-reflectors 6 also indicate distribution at random on a light guide plate 1A3 as illustrated in FIG. 19. Though they don't point at the same direction 8, they in generally tend to face in the direction of the light source 4 to achieve the same purpose of increasing luminance.

Figure 20:
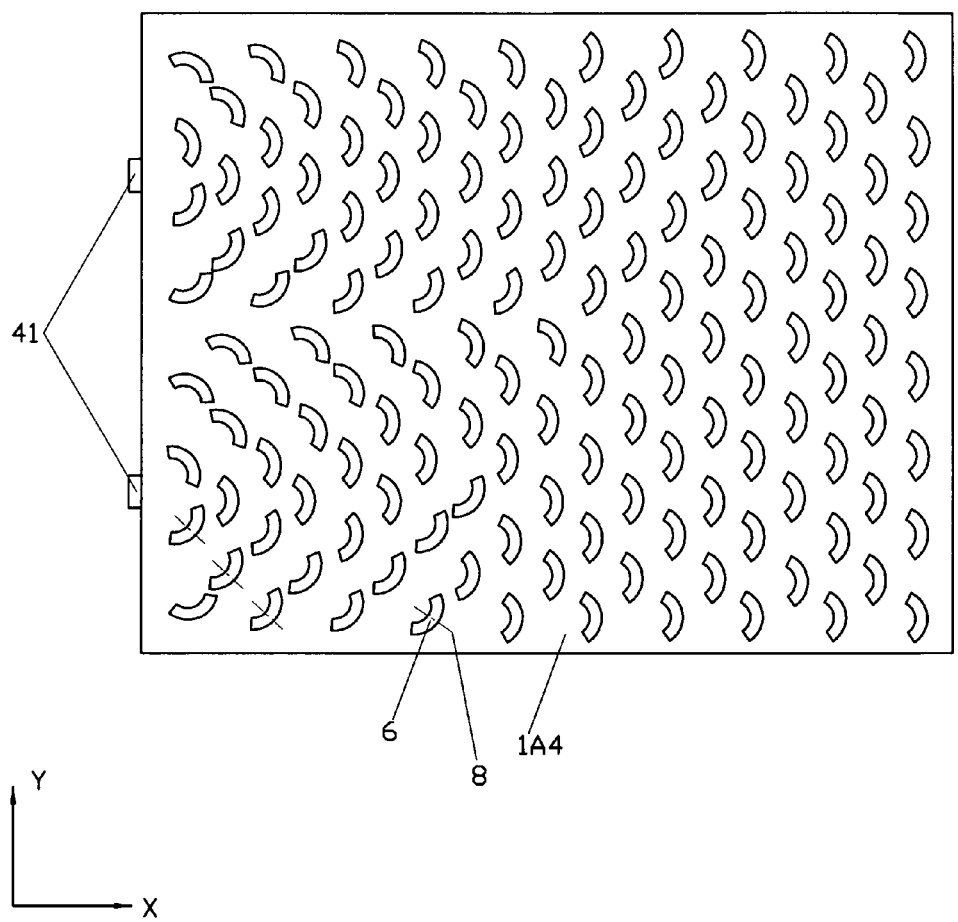

As illustrated in FIG. 20, the micro-reflectors 6 indicate regular distribution on a light guide plate 1A4 and the direction 8 of all or certain parts of the micro-reflectors 6 head for point-like light sources 41 to facilitate incidence of light to radiate into the micro-reflector to increase luminance.

Figure 21:
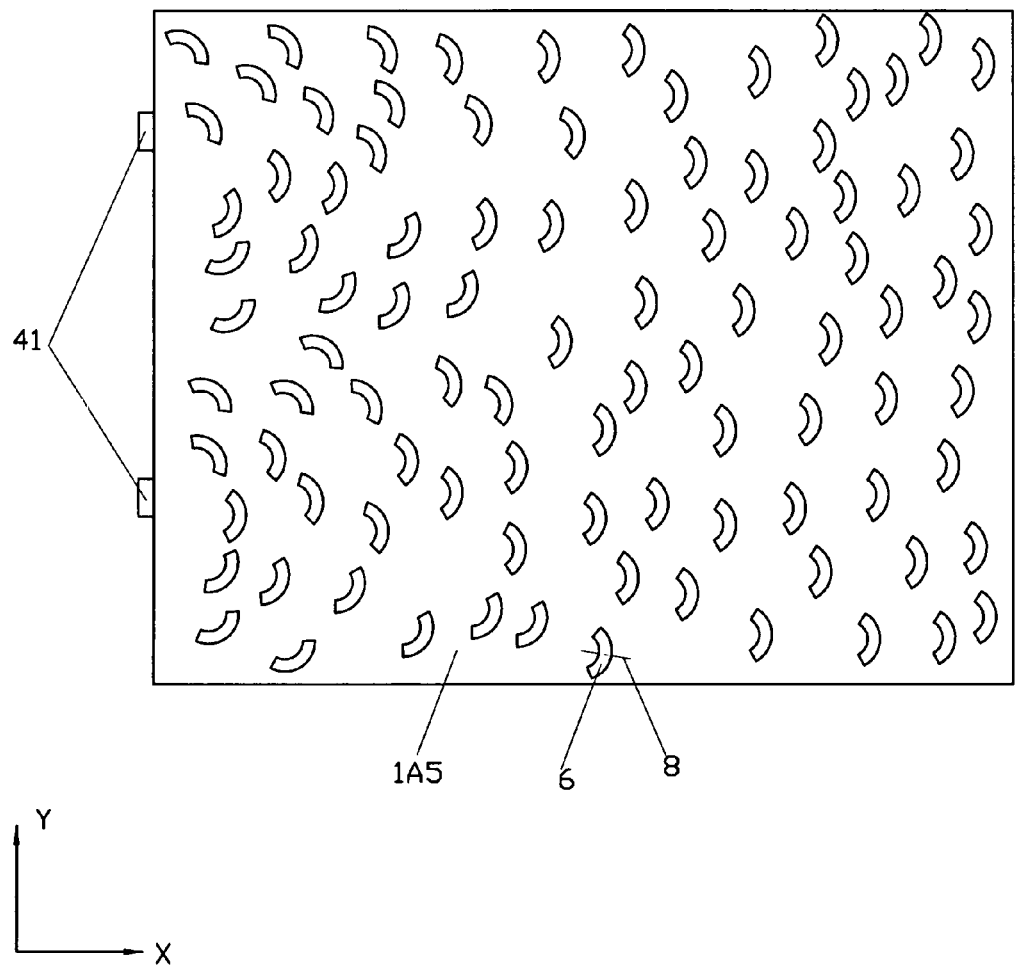

The micro-reflectors 6 indicate distribution at random on a light guide plate 1A5, as illustrated in FIG. 21, and the direction 8 of all or certain parts of the micro-reflectors 6 head for point-like light sources 41 to facilitate incidence of light to radiate into the micro-reflectors to increase luminance.

In FIGS. 16~21, the micro-reflectors 6 may be any single or combination of those preferred embodiments. Any distribution of the micro-reflectors facilitates incidence of light to radiate into the micro-reflectors to increase luminance and the light guide plate to produce highly consistent light illuminating of plane type.

The present invention by promoting luminance and consistence of the light guide plate improves performance of LCD and helps LCD save power consumption. It is to be noted that any change, substitute and replacement may be made without departing from the scope and teaching of the present invention as defined by the claims to be claimed in this application.

What is claimed is:

1. A light guide plate having micro-reflectors; the light guide plate comprising an incidence plane, an illuminating plane, and a bottom; rays of light emitted form a light source entering from the incidence plane into the light guide plate and leaving the illuminating plane; the bottom being located at the opposite side of the illuminating plane; each of the micro-reflectors being disposed at the bottom and intersected with the light guide plate in a direction heading for a recess provided at the bottom of the light guide plate; and each of the micro-reflectors including a light reflection plane located between the incidence plane and the illuminating plane to define an angle θ with the bottom of the light guide plate; the light reflection plane being an arc quadrilateral when viewed from top of the illuminating plane; and the arc quadrilateral having two concentric arc sides parallel with each other.

2. The light guide plate having micro-reflectors of claim 1, wherein each of the micro-reflectors further includes a rear light pervious plane abutted to the light reflection plane; the rear light pervious plane being farther from the incidence plane of the light guide plate in relation to the illumination plane and vertical to the bottom of the light guide plate; two light pervious side planes respectively abutted to both sides of the light reflection plane and vertical to the bottom of the light guide plate; and a hollowed plane disposed in the recess at the bottom of the light guide plate.

3. The light guide plate having micro-reflectors of claim 1, wherein the light reflection plane is taken from a sectional cone having a wide upper part and a narrow lower part; the center of the sectional cone is nearer to the incidence plane; and the light reflection plane is cut for an angle β as its central angle from the center of the sectional cone.

4. The light guide plate having micro-reflectors of claim 1, wherein the light reflection plane is taken from a sectional elliptic cone having a wide upper part and a narrow lower part; the center of the sectional cone is nearer to the incidence plane; and the light reflection plane is cut for an angle β as its central angle from the center of the sectional elliptic cone.

5. The light guide plate having micro-reflectors of claim 1, wherein the light reflection plane is taken from a sectional cone having a narrow upper part and a wide lower part; the center of the sectional cone is nearer to the rear light pervious plane; and the light reflection plane is cut for an angle β as its central angle from the center of the sectional cone.

6. The light guide plate having micro-reflectors of claim 1, wherein the light reflection plane is taken from a sectional elliptic cone having a narrow upper part and a wide lower part; the center of the sectional cone is nearer to the rear light pervious plane; and the light reflection plane is cut for an angle β as its central angle from the center of the sectional elliptic cone.

7. The light guide plate having micro-reflectors of claim 1, wherein the side sectional view of the light reflection plane indicates a straight line.

8. The light guide plate having micro-reflectors of claim 1, wherein the side sectional view of the light reflection plane indicates a concave curve.

9. The light guide plate having micro-reflectors of claim 1, wherein the side sectional view of the light reflection plane indicates a convex curve.

10. A light guide plate having micro-reflectors; the light guide plate comprising an incidence plane, an illuminating plane, and a bottom; rays of light emitted form a light source entering from the incidence plane into the light guide plate and leaving the illuminating plane; the bottom being located at the opposite side of the illuminating plane; each of the micro-reflectors being disposed at the bottom and intersected with the light guide plate in a direction heading for a recess provided at the bottom of the light guide plate; and each of the micro-reflectors including a light reflection plane located between the incidence plane and the illuminating plane to define with the bottom of the light guide plate an angle θ; the light reflection plane being a sector when viewed from top of the illuminating plane.

11. The light guide plate having micro-reflectors of claim 10, wherein each of the micro-reflectors further includes a rear light pervious plane abutted to the light reflection plane; the rear light pervious plane being farther from the incidence plane of the light guide plate in relation to the illumination plane and vertical to the bottom of the light guide plate; two light pervious side planes respectively abutted to both sides of the light reflection plane and vertical to the bottom of the light guide plate; and a hollowed plane disposed in the recess at the bottom of the light guide plate.

12. The light guide plate having micro-reflectors of claim 10, wherein the light reflection plane is taken from a cone having a wide upper part and a narrow lower part; the center of the cone is nearer to the incidence plane; and the light reflection plane is cut for an angle β as its central angle from the center of the cone.

13. The light guide plate having micro-reflectors of claim 10, wherein the light reflection plane is taken from an elliptic cone having a wide upper part and a narrow lower part; the center of the elliptic cone is nearer to the incidence plane; and the light reflection plane is cut for an angle β as its central angle from the center of the elliptic cone.

14. The light guide plate having micro-reflectors of claim 10, wherein the light reflection plane is taken from a cone having a narrow upper part and a wide lower part; the center of the cone is nearer to the rear light pervious plane; and the light reflection plane is cut for an angle β as its central angle from the center of the cone.

15. The light guide plate having micro-reflectors of claim 10, wherein the light reflection plane is taken from an elliptic cone having a narrow upper part and a wide lower part; the center of the elliptic cone is nearer to the rear light pervious plane; and the light reflection plane is cut for an angle β as its central angle from the center of the elliptic cone.

16. The light guide plate having micro-reflectors of claim 10, wherein the side sectional view of the light reflection plane indicates a straight line.

17. The light guide plate having micro-reflectors of claim 10, wherein the side sectional view of the light reflection plane indicates a concave curve.

18. The light guide plate having micro-reflectors of claim 10, wherein the side sectional view of the light reflection plane indicates a convex curve.

* * * * *